(12) United States Patent
Phichej

(10) Patent No.: US 8,742,631 B2
(45) Date of Patent: Jun. 3, 2014

(54) POWER MODULE AND POWER SUPPLY SYSTEM

(75) Inventor: Cheevanantachi Phichej, Samutprakarn (TH)

(73) Assignee: Delta Electronics (Thailand) Public Co., Ltd., Samutprakarn (TH)

( * ) Notice: Subject to any disclaimer, the term of this patent is extended or adjusted under 35 U.S.C. 154(b) by 586 days.

(21) Appl. No.: 13/078,148

(22) Filed: Apr. 1, 2011

(65) Prior Publication Data

US 2012/0162914 A1 Jun. 28, 2012

(30) Foreign Application Priority Data

Dec. 22, 2010 (TW) ................................. 99145386 A

(51) Int. Cl.
*G05F 3/06* (2006.01)
(52) U.S. Cl.
USPC ........................................................ 307/151
(58) Field of Classification Search
USPC ........................................................ 307/151
See application file for complete search history.

(56) References Cited

U.S. PATENT DOCUMENTS

| | | | |
|---|---|---|---|
| 7,196,502 B2 * | 3/2007 | Sugiura et al. | 323/274 |
| 2005/0173988 A1 * | 8/2005 | Priest | 307/52 |
| 2005/0200339 A1 * | 9/2005 | Phillips et al. | 323/243 |
| 2010/0134305 A1 * | 6/2010 | Lu et al. | 340/636.13 |
| 2010/0225294 A1 * | 9/2010 | Herr et al. | 323/299 |
| 2011/0169344 A1 * | 7/2011 | Suekane et al. | 307/151 |

\* cited by examiner

*Primary Examiner* — Jared Fureman
*Assistant Examiner* — Duc M Pham
(74) *Attorney, Agent, or Firm* — Kirton McConkie; Evan R. Witt

(57) ABSTRACT

A power module includes a power conversion circuit, a fan, a controlling unit, a capacitor, a current-adjusting element and a soft start controlling unit. The power conversion circuit is used for outputting a DC voltage. The fan is connected with the power conversion circuit. The controlling unit is used for issuing a control signal to the fan, thereby controlling operation of the fan. The capacitor is connected with the fan in parallel. The current-adjusting element is connected with the capacitor in series for adjusting the magnitude of current flowing through the capacitor. The soft start controlling unit is connected with the current-adjusting element. When the power module is connected with a connector of a power supply system, the soft start controlling unit controls the magnitude of current flowing through the current-adjusting element to be gradually increased, so that the magnitude of current flowing through the capacitor is gradually increased.

10 Claims, 11 Drawing Sheets

POWER MODULE AND POWER SUPPLY SYSTEM

FIELD OF THE INVENTION

The present invention relates to a power module, and more particularly to a power module with a soft start controlling unit and a current-adjusting element. The present invention also relates to a power supply system with such a power module.

BACKGROUND OF THE INVENTION

With increasing development of electronic products, the manufacturers keep improving the power modules of the power supply systems of the electronic products. For example, hot-swappable power modules have been introduced to the market. During the operation of a power module, the heat generated from the power module should be exhausted to the ambient air by an active heat-dissipating mechanism (e.g. a fan) in order to maintain the performance of the power module.

FIG. 1A is a schematic circuit block diagram illustrating a conventional power module. As shown in FIG. 1A, the conventional power module 1 comprises a power conversion circuit 10, a controlling unit 11, a first fan 12 and a second fan 13. The power conversion circuit 10 is configured to convert an input voltage Vin into a DC voltage Vo. The first fan 12 and the second fan 13 are connected with the output terminal of the power conversion circuit 10 in parallel. The controlling unit 11 is electrically connected with the first fan 12 and the second fan 13. After the rotating speed signals Vrs1 and Vrs2 outputted from the first fan 12 and the second fan 13 are received, the controlling unit 11 issues corresponding control signals PWM to the first fan 12 and the second fan 13.

FIG. 1B is a schematic timing waveform diagram illustrating associated signals processed in the power module of FIG. 1A. As shown in FIG. 1B, the control signal PWM is a rectangular wave. In response to a high logic level of the control signal PWM, an output current is transmitted from the output terminal of the power conversion circuit 10 to the first fan 12 and the second fan 13, thereby driving rotations of the first fan 12 and the second fan 13. Whereas, in response to a low logic level of the control signal PWM, no current is inputted into the first fan 12 and the second fan 13. Since the first fan 12 and the second fan 13 are not driven, the first fan 12 and the second fan 13 are continuously rotated because of the inertial motion. Under this circumstance, the rotating speeds of the first fan 12 and the second fan 13 are slowly reduced. Since the rotating speeds of the first fan 12 and the second fan 13 are adjustable according to the control signal PWM, the first fan 12 and the second 13 are not necessarily operated at the maximum rotating speeds. In this situation, a power-saving purpose is achieved.

Please refer to FIG. 1B again. In response to the low logic level of the control signal PWM, the first fan 12 and the second fan 13 are not driven. Meanwhile, the DC voltage Vo is equal to the preset voltage (e.g. 12V). Whereas, in response to the high logic level of the control signal PWM, the first fan 12 and the second fan 13 are driven. Since the energy for rotating the first fan 12 and the second fan 13 is provided by the output terminal of the power conversion circuit 10, the magnitude of the DC voltage Vo decreases. That is, the DC voltage Vo is pulled down to be lower than 12V. Due to the surge effect of the DC voltage Vo, the output performance is impaired.

Please refer to FIG. 1A again. In a case that the control signal PWM fails to be transmitted to the first fan 12 and the second fan 13 (e.g. in a floating state), the first fan 12 and the second fan 13 are disabled. Consequently, the overall temperature of the power module 1 is increased. If the power module 1 is overheated, the power module 1 is possibly damaged.

For avoiding the surge effect of the DC voltage, another power module is disclosed. FIG. 2A is a schematic circuit block diagram illustrating another conventional power module. For avoiding the surge effect of the DC voltage Vo during operations of the first fan 12 and the second fan 13, a capacitor C is connected with the output terminal of the power conversion circuit 10 in parallel. The capacitor C has a large capacitance value for filtering the DC voltage Vo. In such way, regardless of whether, the first fan 12 and the second 13 are rotated or not, a stable DC voltage is outputted. Although the power module 21 of FIG. 2A is effective to avoid the surge effect of the DC voltage encountered from the power module 1 of FIG. 1A, there are still some drawbacks.

FIG. 2B is a schematic circuit block diagram illustrating a power supply system with the power module of FIG. 2A. The power supply system 2 is connected with a load 4. The power supply system 2 comprises plural power modules 21, plural connectors 22 and a power distribution circuit 23. For clarification, only two power modules 21 and two connectors 22 are shown. The power modules 21 are connected with the power distribution circuit 23 through corresponding connectors 22. These power modules 21 are hot-swappable. That is, during the operation of the power supply system 2, the power modules 21 may be directly removed from the connectors 22 or connected with the connectors 22. Since the capacitor C of the power module 21 has a large capacitance value, if the power module 21 has been disabled for a time period, no charge is stored in the capacitor C. If the power module 21 is connected to an enabling power supply system 2, the capacitor C with no charge is transiently in a short-circuited state. Meanwhile, since a large current is abruptly inputted into the connector 22 and the capacitor C, the possibility of burning out the connector 22 and the capacitor C will be increased.

SUMMARY OF THE INVENTION

The present invention provides a power module of a power supply system for avoiding the surge effect of the DC voltage during the operation of the fan, and eliminating the problem of burning out the capacitor of the power module and the connector of the power supply system when the power module is connected with the power supply system.

The present invention also provides a power supply system with plural power modules.

In accordance with an aspect of the present invention, there is provided a power module of a power supply system. The power module is hot-swappable to be connected with a connector of the power supply system or detached from the connector. The power module includes a power conversion circuit, a fan, a controlling unit, a capacitor, a current-adjusting element and a soft start controlling unit. The power conversion circuit is used for outputting a DC voltage. The fan is connected with the power conversion circuit. The controlling unit is used for issuing a control signal to the fan, thereby controlling operation of the fan. The capacitor is connected with the fan in parallel. The current-adjusting element is connected with the capacitor in series for adjusting the magnitude of current flowing through the capacitor. The soft start controlling unit is connected with the current-adjusting element. When the power module is connected with the connector of the power supply system, the soft start controlling unit controls the magnitude of current flowing through the current-adjusting element to be gradually increased, so that the magnitude of current flowing through the capacitor is gradually increased.

In accordance with another aspect of the present invention, there is provided a power supply system. The power supply system includes a power distribution circuit, plural connectors and plural power modules. The connectors have respective first ends connected with the power distribution circuit. The power modules are hot-swappable to be connected with second ends of corresponding connectors or detached from the second ends of corresponding connectors. Each of the power modules includes a power conversion circuit, a fan, a controlling unit, a capacitor, a current-adjusting element and a soft start controlling unit. The power conversion circuit is used for outputting a DC voltage. The fan is connected with the power conversion circuit. The controlling unit is used for issuing a control signal to the fan, thereby controlling operation of the fan. The capacitor is connected with the fan in parallel. The current-adjusting element is connected with the capacitor in series for adjusting the magnitude of current flowing through the capacitor. The soft start controlling unit is connected with the current-adjusting element. When the power module is connected with the connector of the power supply system, the soft start controlling unit controls the magnitude of current flowing through the current-adjusting element to be gradually increased, so that the magnitude of current flowing through the capacitor is gradually increased.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
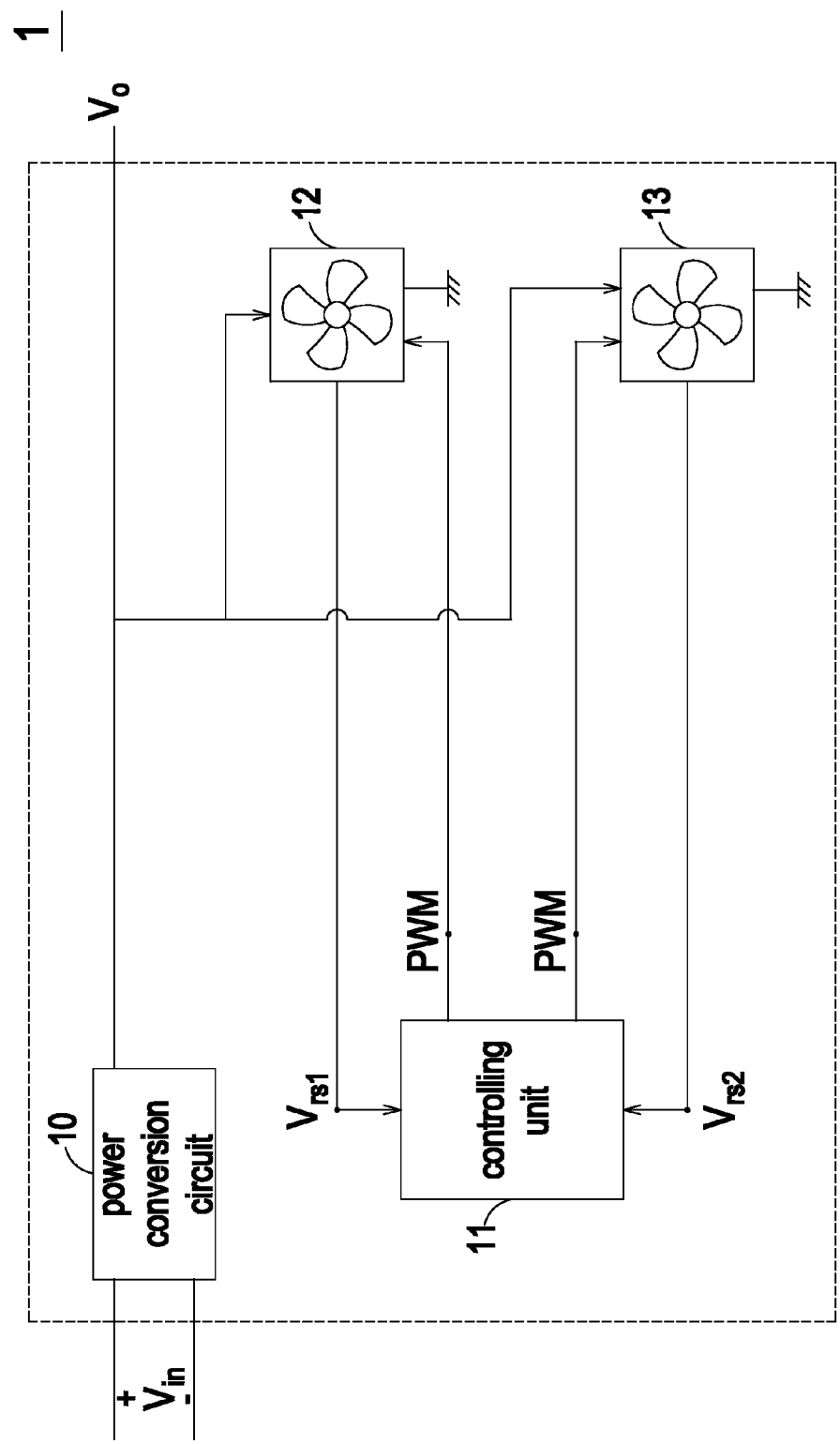
FIG. 1A is a schematic circuit block diagram illustrating a conventional power module.
Figure 1B:
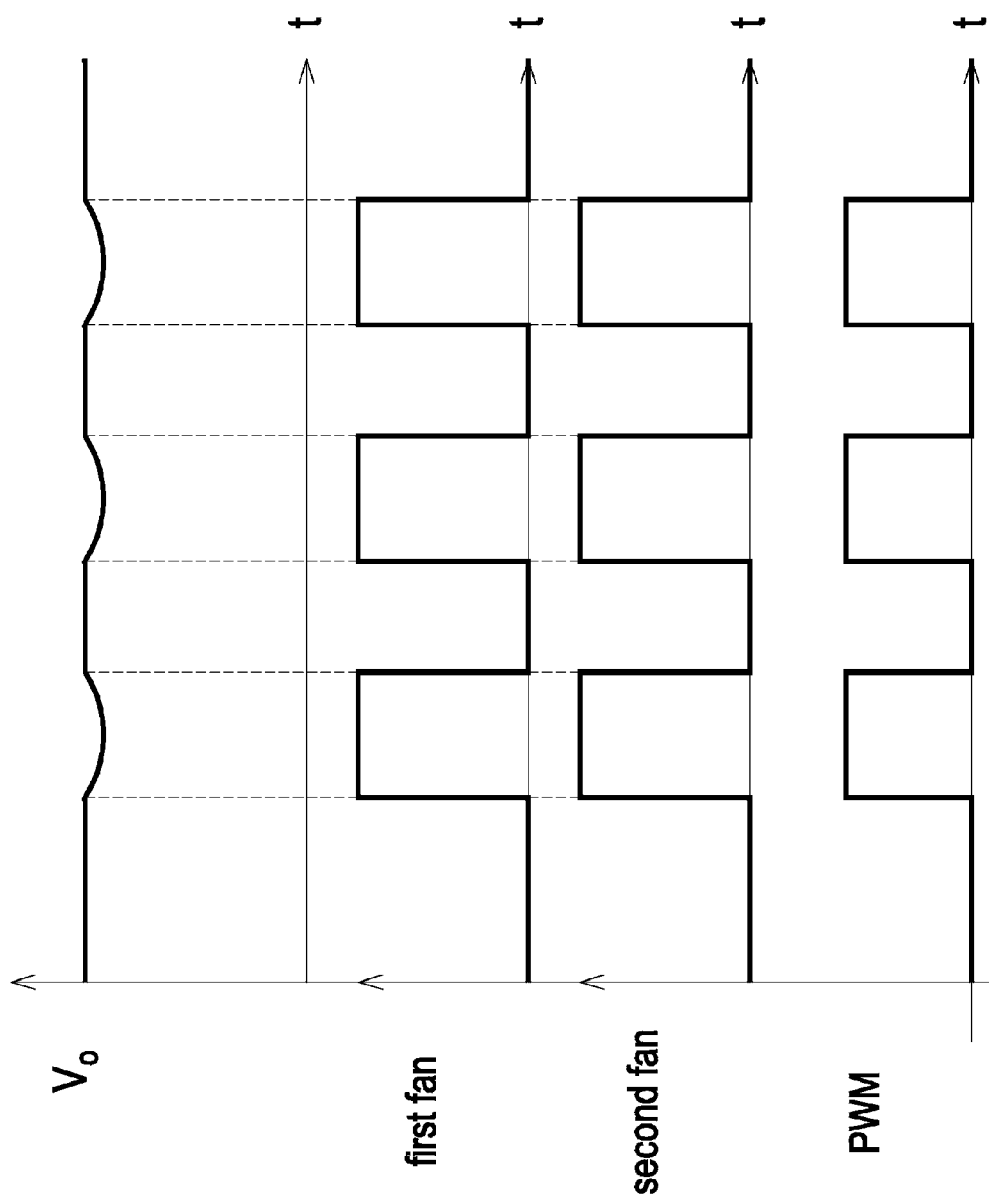
FIG. 1B is a schematic timing waveform diagram illustrating associated signals processed in the power module of FIG. 1A.
Figure 2A:
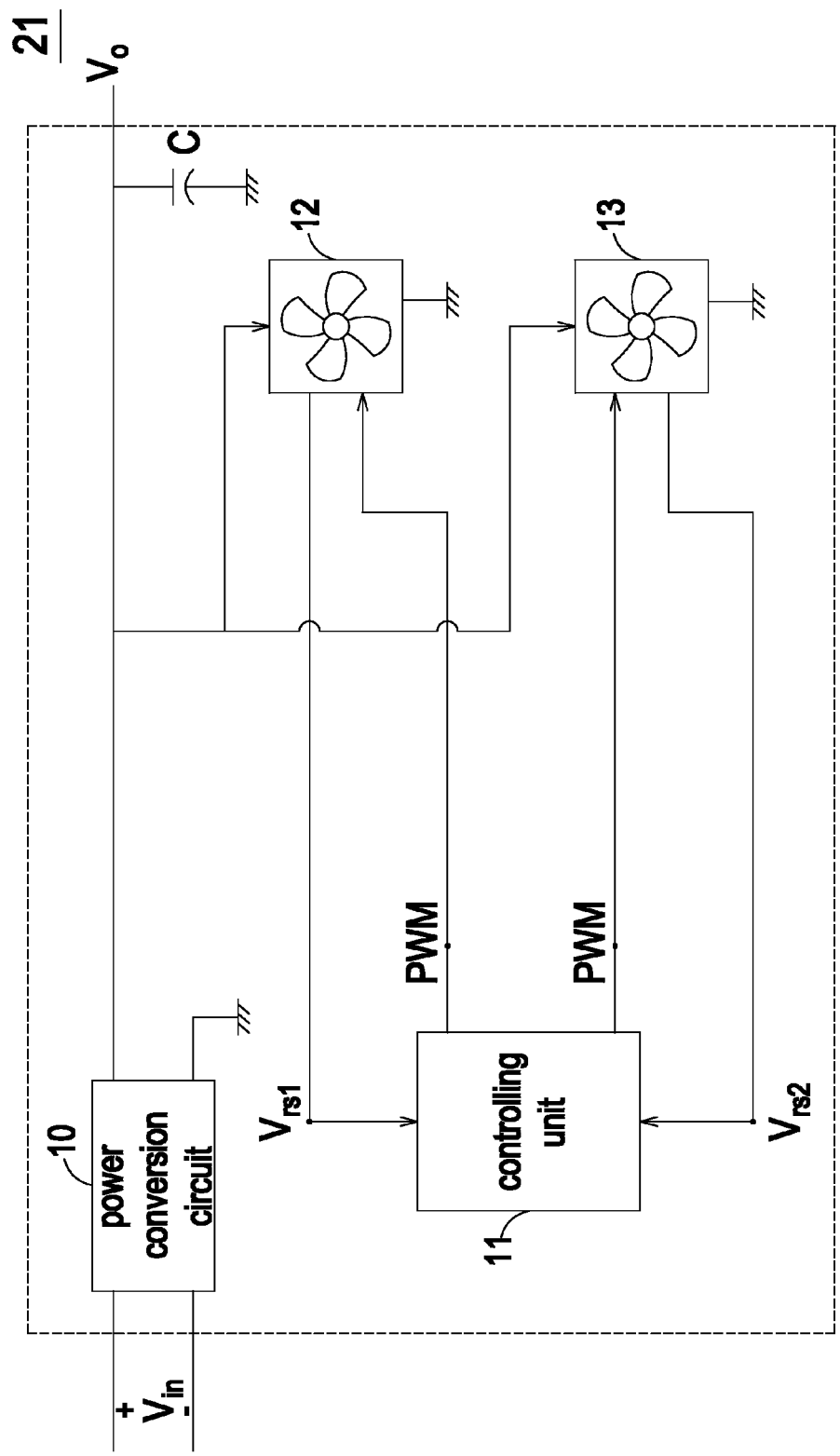
FIG. 2A is a schematic circuit block diagram illustrating another conventional power module.
Figure 2B:
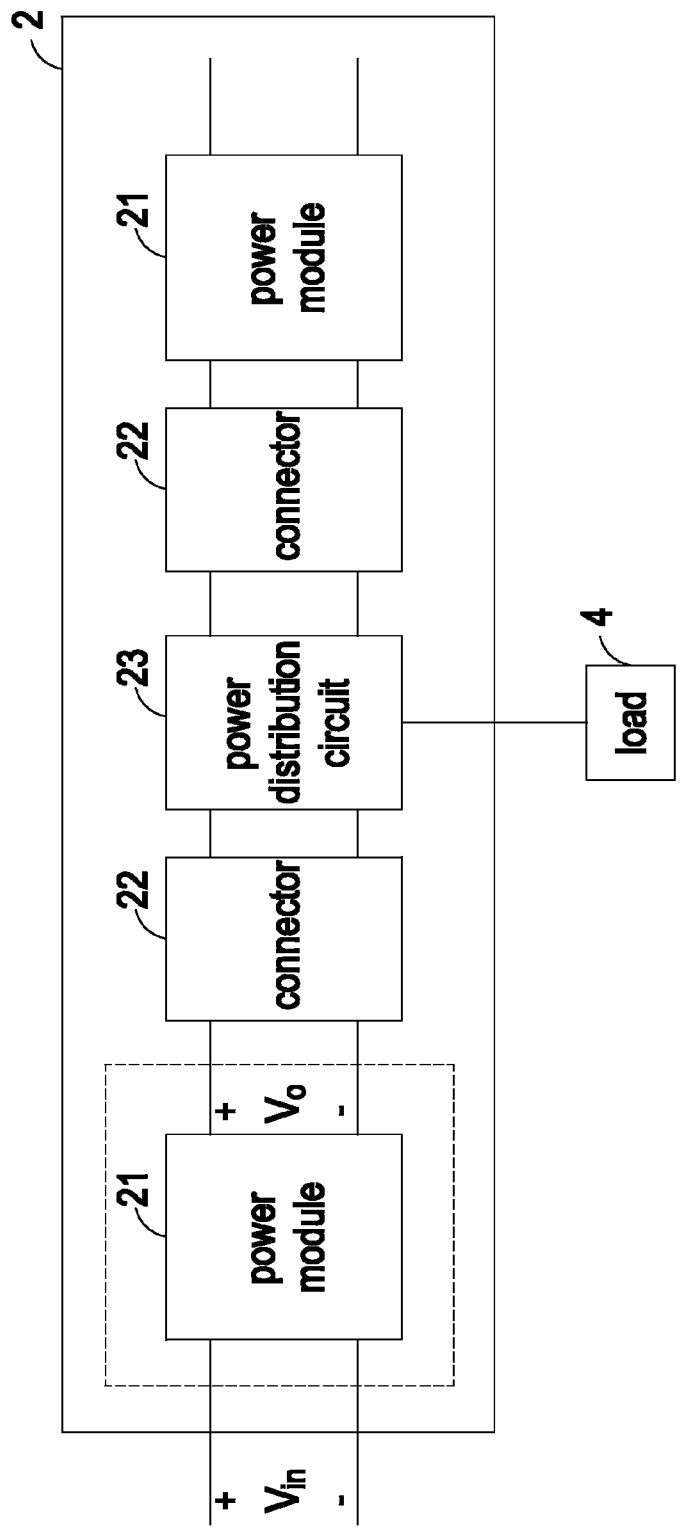
FIG. 2B is a schematic circuit block diagram illustrating a power supply system with the power module of FIG. 2A.
Figure 3A:
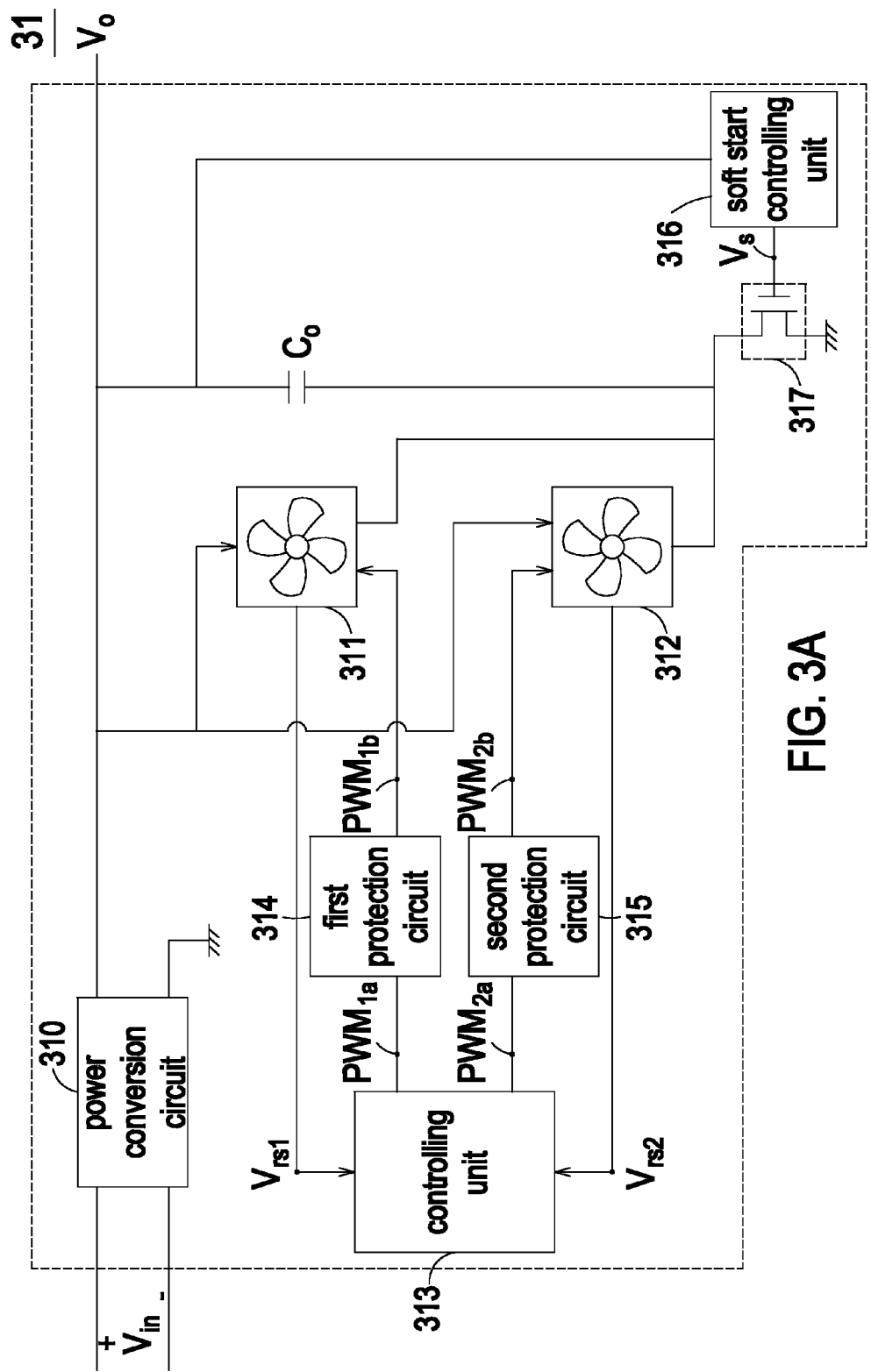
FIG. 3A is a schematic circuit block diagram illustrating a power module according to an embodiment of the present invention.

FIG. 3A is a schematic circuit block diagram illustrating a power module according to an embodiment of the present invention. As shown in FIG. 3A, the power module 31 comprises a power conversion circuit 310, a first fan 311, a second fan 312, a controlling unit 313, a first protection circuit 314, a second protection circuit 315, a soft start controlling unit 316, a current-adjusting element 317 and a capacitor Co. The power conversion circuit 310 is configured to convert an input voltage Vin into a DC voltage Vo. The first fan 311 and the second fan 312 are connected with the power conversion circuit 310 for enhancing the heat-dissipating efficacy of the power module 31. The controlling unit 313 is electrically connected with the first fan 311 and the second fan 312 for receiving a first rotating speed signal Vrs1 and a second rotating speed signal Vrs2, respectively. After the first rotating speed signal Vrs1 and the second rotating speed signal Vrs2 are received, the controlling unit 313 outputs a first front-end control signal $PWM_{1a}$ and a second front-end control signal $PWM_{2a}$. By the first protection circuit 314 and the second protection circuit 315, the first front-end control signal $PWM_{1a}$ and the second front-end control signal $PWM_{2a}$ are respectively converted into a first rear-end control signal $PWM_{1b}$ and a second rear-end control signal $PWM_{2b}$. The first rear-end control signal $PWM_{1b}$ and the second rear-end control signal $PWM_{2b}$ are transmitted to the first fan 311 and the second fan 312 to control the rotating speeds of the first fan 311 and the second fan 312. The capacitor Co is connected with the power conversion circuit 310 and the current-adjusting element 317 for filtering off the noise contained in the DC voltage Vo, thereby adjusting the DC voltage Vo into a stable DC voltage and avoiding the surge effect. The current-adjusting element 317 has a first conduction terminal connected with the capacitor Co and a second conduction terminal connected with a ground terminal. The control terminal of the current-adjusting element 317 is connected with the soft start controlling unit 316. The soft start controlling unit 316 is connected with the power conversion circuit 310 for receiving the DC voltage Vo. According to the energy externally transmitted from the power supply system 3 (see FIG. 3B), the soft start controlling unit 316 issues a control voltage Vs for controlling the current-adjusting element 317.

Figure 3B:
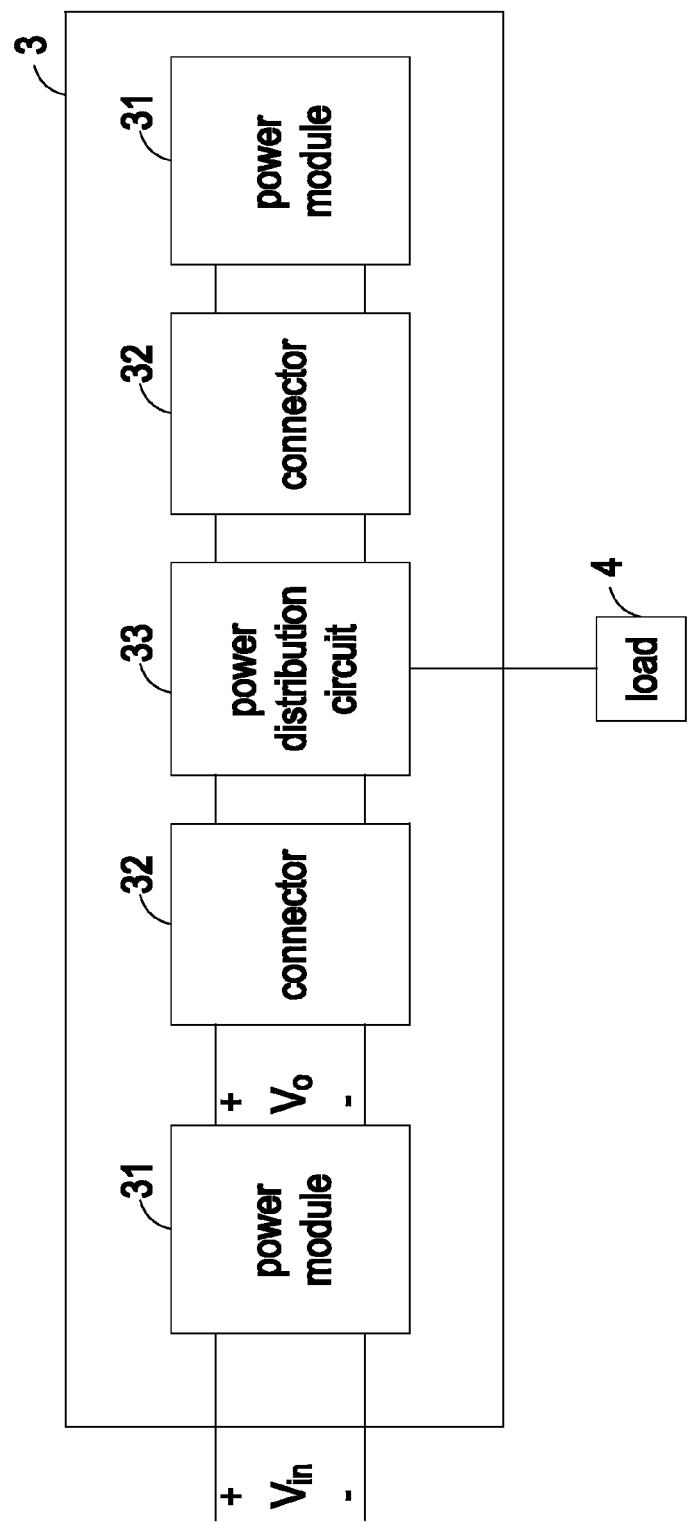
FIG. 3B is a schematic circuit block diagram illustrating a power supply system with the power module of FIG. 3A.

FIG. 3B is a schematic circuit block diagram illustrating a power supply system with the power module of FIG. 3A. The power supply system 3 is connected with a load 4. The power supply system 3 comprises plural power modules 31, plural connectors 32 and a power distribution circuit 33. For clarification, only two power modules 31 and two connectors 32 are shown. The power modules 31 are connected with the power distribution circuit 33 through corresponding connectors 32. These power modules 31 are hot-swappable. That is, during the operation of the power supply system 3, the power modules 31 may be directly removed from the connectors 32 or connected with the connectors 32. After the power module 31 is connected with a corresponding connector 32 of the power supply system 3, the current-adjusting element 317 is controlled by the soft start controlling unit 316 to be gradually conducted. Moreover, through a sensing pin 318 (see FIGS. 5 and 6) of the soft start controlling unit 316, the soft start controlling unit 316 can judge whether the power module 31 is connected with the power distribution circuit 33. In addition, according to the energy transmitted to the soft start controlling unit 316, the soft start controlling unit 316 can judge whether the power module 31 is connected with the power distribution circuit 33 (see FIG. 4). Since the current-adjusting element 317 is connected with the capacitor Co is series, the current flowing through the capacitor Co may be gradually increased. In such way, even if the power module 31 has been disabled for a time period and no charge is stored in the capacitor Co, the capacitor Co is no longer transiently in the short-circuited state. That is, since the current from the power distribution circuit 33 is not abruptly inputted into the connector 32 and the capacitor Co, the problem of burning out the connector 32 and the capacitor Co will be avoided.

Figure 4:
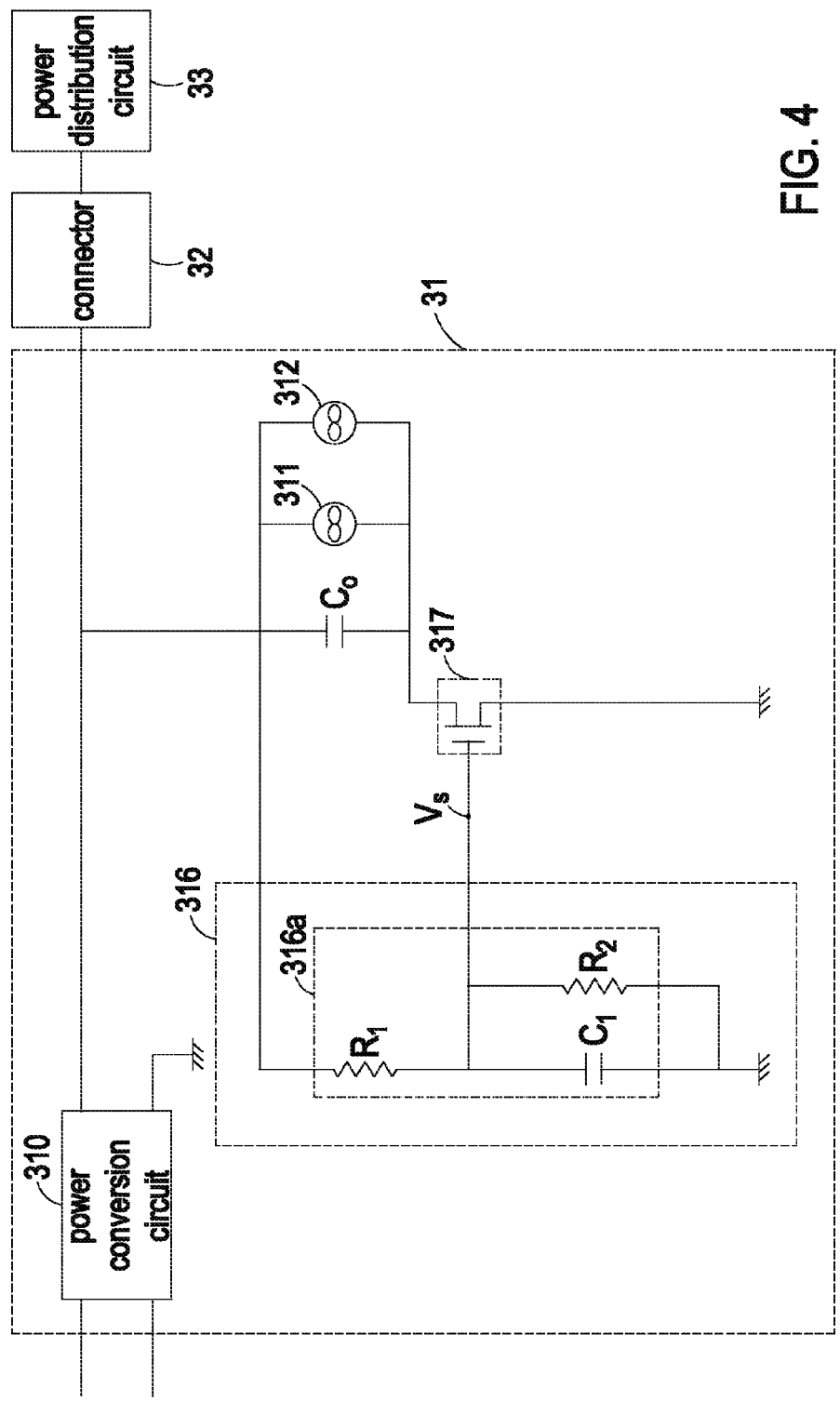
FIG. 4 is a schematic circuit diagram illustrating the soft start controlling unit of FIG. 3A and a portion of the power module according to an embodiment of the present invention.

FIG. 4 is a schematic circuit diagram illustrating the soft start controlling unit of FIG. 3A and a portion of the power module according to an embodiment of the present invention. An example of the current-adjusting element 317 is a MOS-FET (metal oxide semiconductor field effect transistor). In this embodiment, the soft start controlling unit 316 includes a charging circuit 316a. The charging circuit 316a comprises a first resistor R1, a second resistor R2 and a first capacitor C1. The first ends of the first resistor R1, the second resistor R2 and the first capacitor C1 are connected with the control terminal of the current-adjusting element 317. The second end of the first resistor R1 is connected with the output terminal of the power conversion circuit 310. The second ends of the second resistor R2 and the first capacitor C1 are connected with the ground terminal.

In a case that the power module 31 is disconnected from the power supply system 3, the power supply system 3 is in an open state. Meanwhile, the control voltage Vs is in the low voltage-level state (e.g. zero), and thus the current-adjusting element 317 is shut off. Whereas, in a case that the power module 31 is connected with the power supply system 3, the electric energy outputted from the power distribution circuit 33 of the power supply system 3 is introduced into the power module 31. The electric energy is transmitted through the first resistor R1 to charge the first capacitor C1. Consequently, the magnitude of the control voltage Vs is slowly increased. When the magnitude of the control voltage Vs is higher than the conduction voltage Vth of the current-adjusting element 317, the current-adjusting element 317 is conducted. That is, the current flowing through the current-adjusting element 317 is gradually increased. Since the current from the power distribution circuit 33 is not abruptly inputted into the connector 32 and the capacitor Co, the problem of burning out the connector 32 and the capacitor Co will be avoided.

Figure 5:
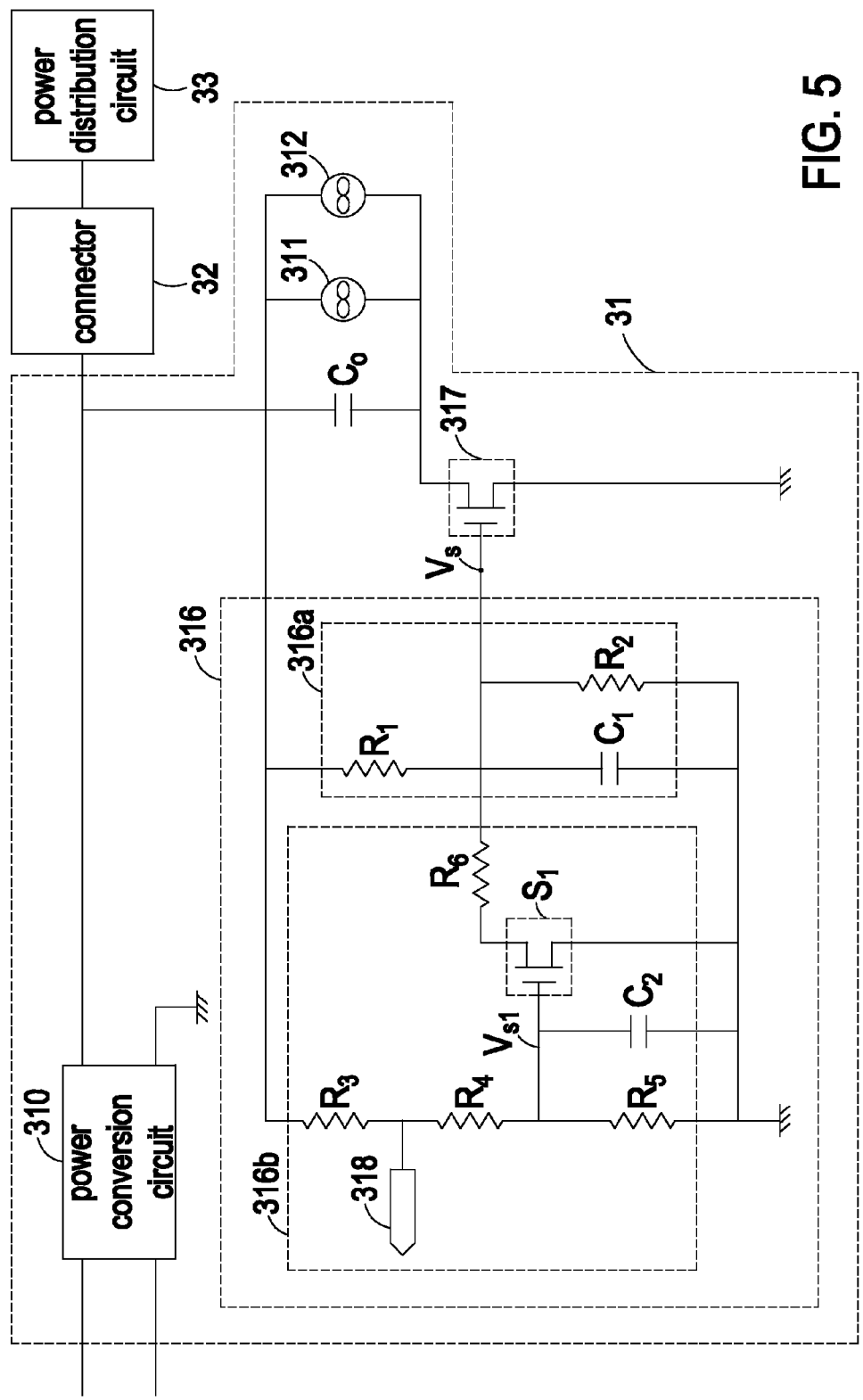
FIG. 5 is a schematic circuit diagram illustrating the soft start controlling unit of FIG. 3A and a portion of the power module according to another embodiment of the present invention.

FIG. 5 is a schematic circuit diagram illustrating the soft start controlling unit of FIG. 3A and a portion of the power module according to another embodiment of the present invention. In this embodiment, the soft start controlling unit 316 includes a charging circuit 316a and a discharging circuit 316b. The charging circuit 316a comprises a first resistor R1, a second resistor R2 and a first capacitor C1. The discharging circuit 316b includes a sensing pin 318, a third resistor R3, a fourth resistor R4, a fifth resistor R5, a sixth resistor R6, a second capacitor C2 and a first switch element S1. The first ends of the first resistor R1, the second resistor R2 and the first capacitor C1 are connected with the control terminal of the current-adjusting element 317. The second end of the first resistor R1 is connected with the output terminal of the power conversion circuit 310. The second ends of the second resistor R2 and the first capacitor C1 are connected with the ground terminal. A first end of the third resistor R3 is connected with the output terminal of the power conversion circuit 310. A second end of the third resistor R3 and a first end of the fourth resistor R4 are connected with the sensing pin 318. A second end of the fourth resistor R4, a first end of the fifth resistor R5 and a first end of the second capacitor C2 are connected with the control terminal of the first switch element S1. A second end of the fifth resistor R5 and a second end of the second capacitor C2 are connected with the ground terminal. A first end of the sixth resistor R6 is connected with a conduction terminal of the first switch element S1. A second end of the sixth resistor R6 is connected with the control terminal of the current-adjusting element 317.

In a case that the power module 31 is connected with the power supply system 3, a low voltage sensing signal is received by the sensing pin 318. In response to the low voltage sensing signal, the first control voltage Vs1 inputted into the control terminal of the first switch element S1 is pulled down, so that the first switch element S1 is shut off. Meanwhile, the electric energy outputted from the power distribution circuit 33 of the power supply system 3 is transmitted through the first resistor R1 to charge the first capacitor C1. When the magnitude of the control voltage Vs is higher than the conduction voltage Vth of the current-adjusting element 317, the current-adjusting element 317 is conducted. Meanwhile, the electric energy is inputted into the capacitor Co, and the magnitude of the current is gradually increased. Since the current from the power distribution circuit 33 is not abruptly inputted into the connector 32 and the capacitor Co, the problem of burning out the connector 32 and the capacitor Co will be avoided.

In a case that the power module 31 is disconnected from the power supply system 3, the sensing pin 318 is in a floating state. The energy stored in the capacitor Co is transmitted to the second capacitor C2 through the third resistor R3 and the fourth resistor R4. As the first control voltage Vs1 is pulled up, the first switch element S1 is conducted. Moreover, since the energy stored in the first capacitor C1 is discharged through the sixth resistor R6 and the first switch element S1, the magnitude of the control voltage Vs is lower than the conduction voltage Vth of the current-adjusting element 317. Under this circumstance, the current-adjusting element 317 is shut off. Since the current-adjusting element 317 is shut off, the current-adjusting element 317 will not be conducted immediately after the power module 31 is connected with the power supply system 3 at the next time. As a consequently, the problem of burning out the connector 32 and the capacitor Co will be avoided.

Figure 6:
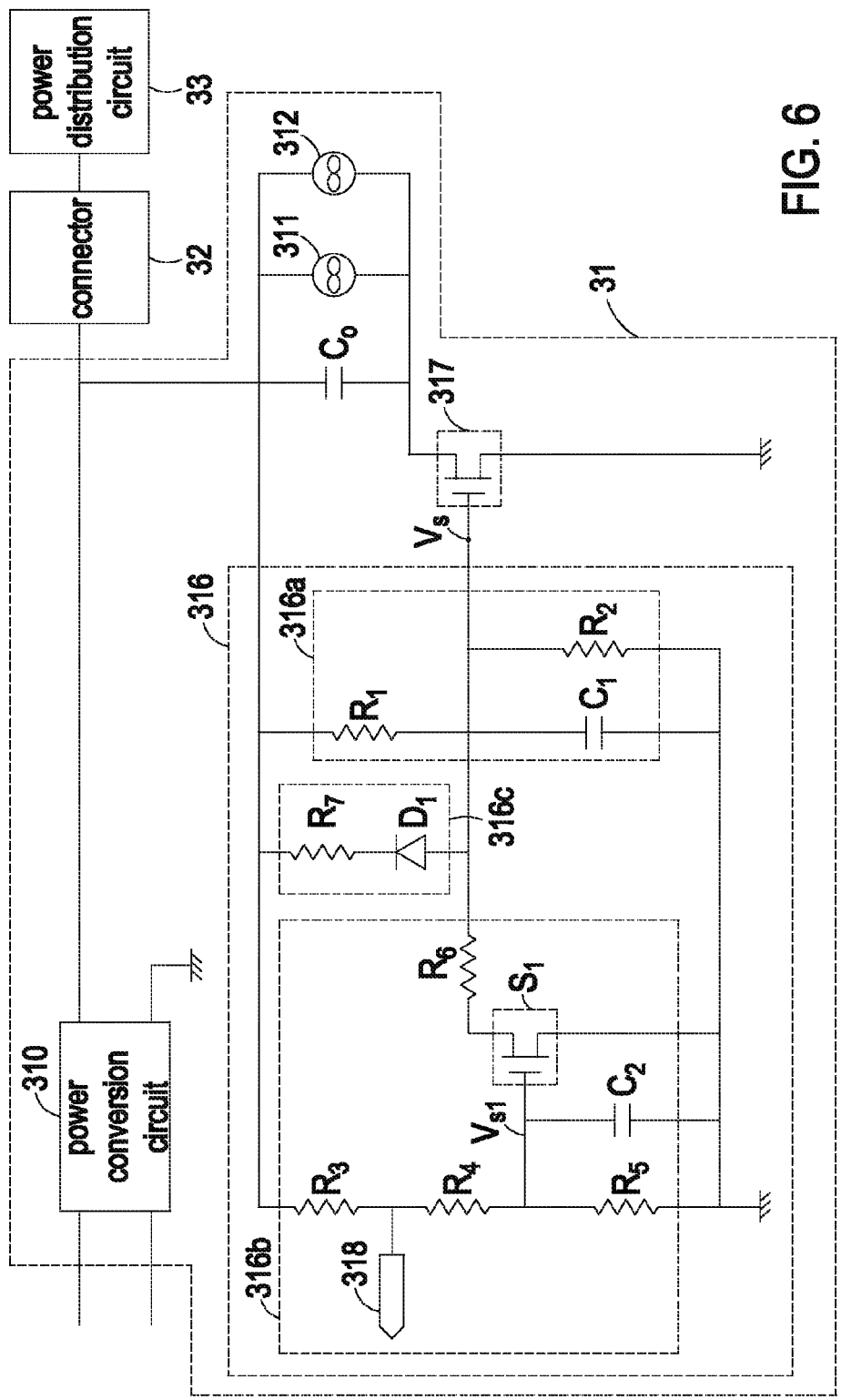
FIG. 6 is a schematic circuit diagram illustrating the soft start controlling unit of FIG. 3A and a portion of the power module according to a further embodiment of the present invention.

FIG. 6 is a schematic circuit diagram illustrating the soft start controlling unit of FIG. 3A and a portion of the power module according to a further embodiment of the present invention. In this embodiment, the soft start controlling unit 316 includes a charging circuit 316a, a discharging circuit 316b and an acceleration discharging circuit 316c. The charging circuit 316a comprises a first resistor R1, a second resistor R2 and a first capacitor C1. The discharging circuit 316b comprises a sensing pin 318, a third resistor R3, a fourth resistor R4, a fifth resistor R5, a sixth resistor R6, a second capacitor C2 and a first switch element S1. The acceleration discharging circuit 316c comprises a seventh resistor R7 and a first diode D1.

The first ends of the first resistor R1, the second resistor R2 and the first capacitor C1 are connected with the control terminal of the current-adjusting element 317. The second end of the first resistor R1 is connected with the output terminal of the power conversion circuit 310. The second ends of the second resistor R2 and the first capacitor C1 are connected with the ground terminal. A first end of the third resistor R3 is connected with the output terminal of the power conversion circuit 310. A second end of the third resistor R3 and a first end of the fourth resistor R4 are connected with the sensing pin 318. A second end of the fourth resistor R4, a first end of the fifth resistor R5 and a first end of the second capacitor C2 are connected with the control terminal of the first switch element S1. A second end of the fifth resistor R5 and a second end of the second capacitor C2 are connected with the ground terminal. A first end of the sixth resistor R6 is connected with a conduction terminal of the first switch element S1. A second end of the sixth resistor R6 is connected with the control terminal of the current-adjusting element 317. A first end of the seventh resistor R7 is connected with the output terminal of the power conversion circuit 310. A second end of the seventh resistor R7 is connected with a cathode of the first diode D1. An anode of the first diode D1 is connected with the control terminal of the current-adjusting element 317.

In a case that the power module 31 is connected with the power supply system 3, a low voltage sensing signal is received by the sensing pin 318. In response to the low voltage sensing signal, the first control voltage Vs1 inputted into the control terminal of the first switch element S1 is pulled down, so that the first switch element S1 is shut off. Meanwhile, the electric energy outputted from the power distribution circuit 33 of the power supply system 3 is transmitted through the first resistor R1 to charge the first capacitor C1. When the magnitude of the control voltage Vs is higher than the conduction voltage Vth of the current-adjusting element 317, the current-adjusting element 317 is conducted. Meanwhile, the electric energy is inputted into the capacitor Co, and the magnitude of the current is gradually increased. Since the current from the power distribution circuit 33 is not abruptly inputted into the connector 32 and the capacitor Co, the problem of burning out the connector 32 and the capacitor Co will be avoided.

In a case that the power module 31 is disconnected from the power supply system 3, the sensing pin 318 is in a floating state. The energy stored in the capacitor Co is transmitted to the second capacitor C2 through the third resistor R3 and the fourth resistor R4. As the first control voltage Vs1 is pulled up, the first switch element S1 is conducted. Meanwhile, since the energy stored in the first capacitor C1 is discharged through the sixth resistor R6 and the first switch element S1. The seventh resistor R7 and the first diode D1 are configured to increase the speed of discharging the first capacitor C1. In such way, the magnitude of the control voltage Vs is reduced to be lower than the conduction voltage Vth of the current-adjusting element 317 at an accelerated speed. Under this circumstance, the current-adjusting element 317 is shut off. Since the current-adjusting element 317 is shut off, the current-adjusting element 317 will not be conducted immediately after the power module 31 is connected with the power supply system 3 at the next time. As a consequently, the problem of burning out the connector 32 and the capacitor Co will be avoided.

Figure 7:
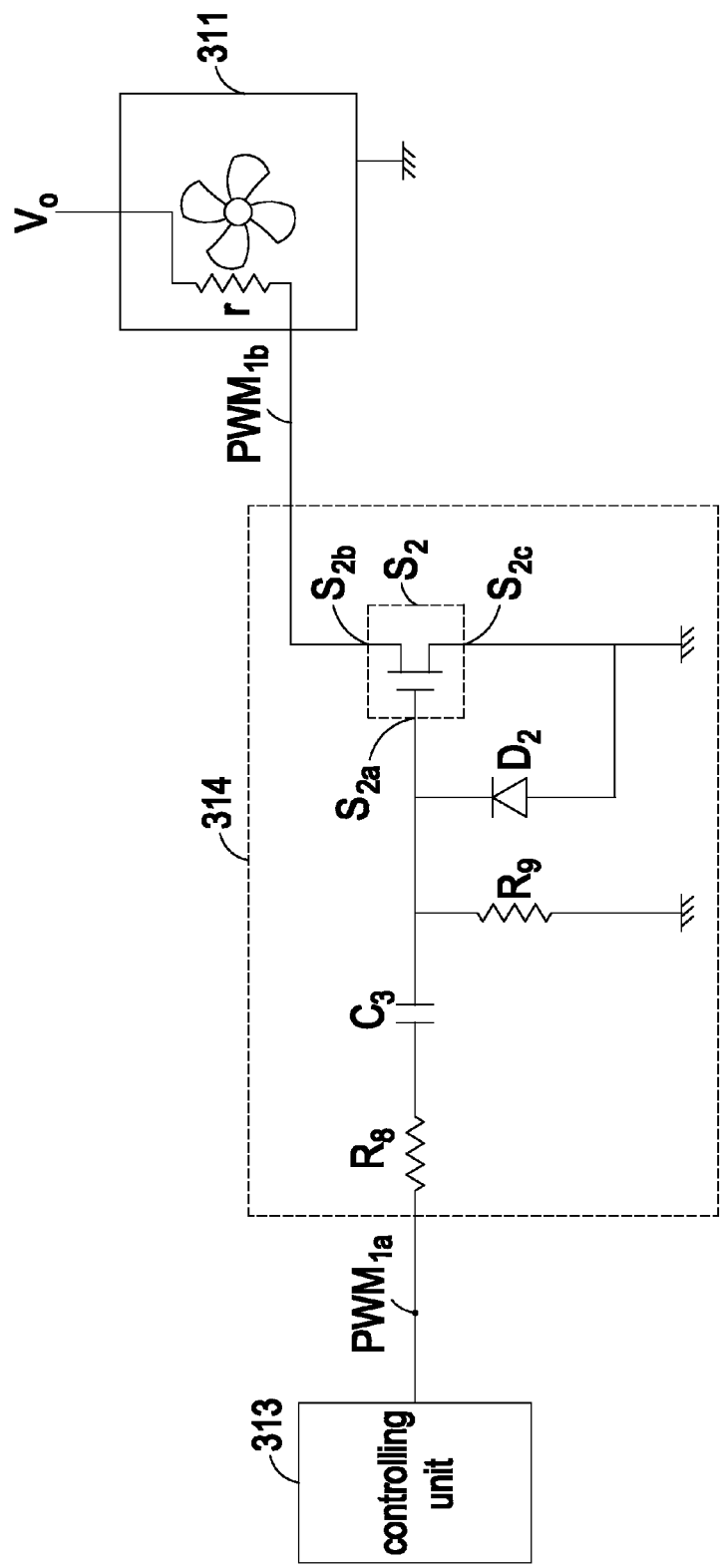
FIG. 7 is a schematic circuit diagram illustrating the first protection circuit of FIG. 3A and a portion of the power module according to an embodiment of the present invention.

FIG. 7 is a schematic circuit diagram illustrating the first protection circuit of FIG. 3A and a portion of the power module according to an embodiment of the present invention. In this embodiment, the first protection circuit 314 comprises a second switch element S2, an eighth resistor R8, a ninth resistor R9, a third capacitor C3 and a second diode D2. An example of the second switch element S2 is a MOSFET (metal oxide semiconductor field effect transistor). A first end of the eighth resistor R8 is connected with the controlling unit 31. A second end of the eighth resistor R8 is connected with a first end of the third capacitor C3. A second end of the third capacitor C3 and a first end of the ninth resistor R9 are connected with the control terminal S2a of the second switch element S2. A second end of the ninth resistor R9 is connected with the ground terminal. A first conduction terminal S2b of the second switch element S2 is connected with the first fan 311. The anode of the second diode D2 and a second conduction terminal of the second switch element S2 are connected to the ground terminal. The eighth resistor R8 and the third capacitor C3 are used to filter the first front-end control signal $PWM_{1a}$. The ninth resistor R9 is used to stabilize the front-end control signal $PWM_{1a}$. When the second switch element S2 is shut off, the second diode D2 may accelerate discharging the third capacitor C3.

Please refer to FIG. 7 again. The first front-end control signal $PWM_{1a}$ is outputted from the controlling unit 313. In response to the high logic level of the first front-end control signal $PWM_{1a}$, the second switch element S2 is conducted. Meanwhile, the first protection circuit 314 issues a first rear-end control signal $PWM_{1b}$, which is in a low logic level. Since the first conduction terminal S2b of the second switch element S2 is in the low voltage-level state (e.g. zero), no energy is inputted into the first fan 311. Whereas, in response to the low logic level of the first front-end control signal $PWM_{1a}$, the second switch element S2 is shut off. Meanwhile, the first protection circuit 314 issues a first rear-end control signal $PWM_{1b}$, which is in a high logic level. Due to an internal resistor r of the first fan 311, the DC voltage Vo (e.g. 12V) is inputted into the first fan 311 to drive rotation of the first fan 311. Since no energy is inputted into the first fan 311 in response to the high logic level of the first front-end control signal $PWM_{1a}$ but the energy is inputted into the first fan 311 in response to the low logic level of the first front-end control signal $PWM_{1a}$, the first protection circuit 314 may be considered as an inverting control circuit. Under this circumstance, if the controlling unit 313 is abnormal (e.g. in a floating state), the first fan 311 can be continuously operated to prevent from overheating damage of the power module.

Figure 8:
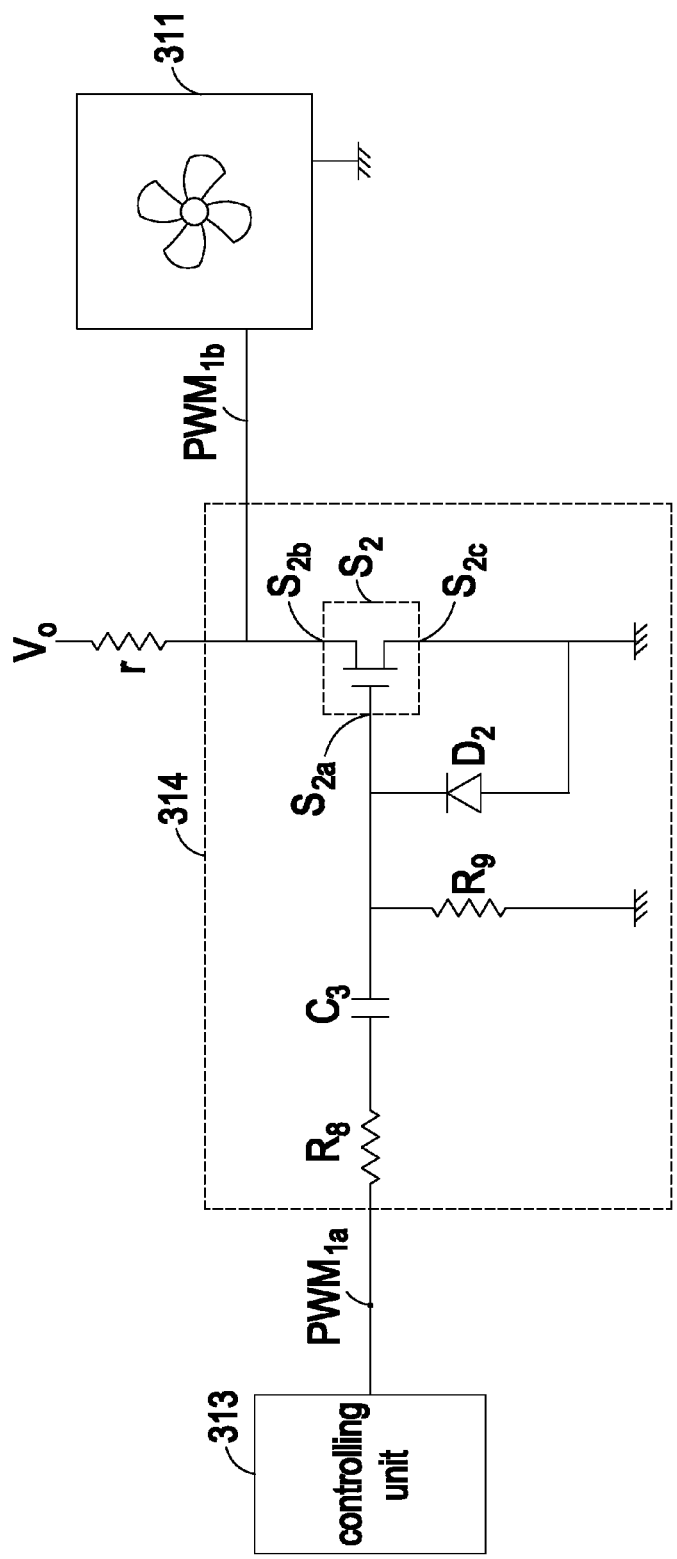
FIG. 8 is a schematic circuit diagram illustrating a first protection circuit applied to a fan with no internal resistor according to an embodiment of the present invention.

FIG. 8 is a schematic circuit diagram illustrating a first protection circuit applied to a fan with no internal resistor according to an embodiment of the present invention. In this embodiment, the resistor r is disposed outside the first fan 311. A first end of the resistor r is connected with the first conduction terminal S2b of the second switch element S2. A second end of the resistor r is connected with the output terminal of the power conversion circuit 310. In response to the high logic level of the first front-end control signal $PWM_{1a}$, the second switch element S2 is conducted. Meanwhile, the first protection circuit 314 issues a first rear-end control signal $PWM_{1b}$, which is in a low logic level. Since the first conduction terminal S2b of the second switch element S2 is in the low voltage-level state (e.g. zero), no energy is inputted into the first fan 311. Whereas, in response to the low logic level of the first front-end control signal $PWM_{1a}$, the second switch element S2 is shut off. Meanwhile, the first protection circuit 314 issues a first rear-end control signal $PWM_{1b}$, which is in a high logic level. Due to the resistor r of the first fan 311, the DC voltage Vo (e.g. 12V) is inputted into the first fan 311 to drive rotation of the first fan 311. Since no energy is inputted into the first fan 311 in response to the high logic level of the first front-end control signal $PWM_{1a}$ but the energy is inputted into the first fan 311 in response to the low logic level of the first front-end control signal $PWM_{1a}$, the first protection circuit 314 may be considered as an inverting control circuit. Under this circumstance, if the controlling unit 313 is abnormal (e.g. in a floating state), the first fan 311 can be continuously operated to prevent from overheating damage of the power module.

Please refer to FIG. 3A again. The configurations and the operating principles of the second protection circuit 315 with respect to the controlling unit 313 and the second fans 312 are similar to those of the illustrated in the first protection circuit 314 of FIGS. 7 and 8, and are not redundantly described herein.

From the above description, the power module of the present invention uses the capacitor to filter off the noise contained in the DC voltage to avoid the surge effect. When the power module is connected with the connector of the power supply system, the soft start controlling unit controls the magnitude of current flowing through the current-adjusting element to be gradually increased, so that the purposes of protecting the capacitor of the power module and the connector of the power supply system are achievable. Moreover, the power module of the present invention further includes a protection circuit between the controlling unit and the fan. Even if the signal outputted from the controlling unit is abnormal, the protection circuit can allow the fan to be continuously operated in order to prevent from overheating damage of the power module.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power module of a power supply system, said power module being hot-swappable to be connected with a connector of said power supply system or detached from said connector, said power module comprising:
    a power conversion circuit for outputting a DC voltage;
    a fan connected with said power conversion circuit;
    a controlling unit for issuing a control signal to said fan, thereby controlling operation of said fan;
    a capacitor connected with said fan in parallel;
    a current-adjusting element connected with said capacitor in series for adjusting the magnitude of current flowing through said capacitor; and
    a soft start controlling unit connected with said current-adjusting element, wherein when said power module is connected with said connector of said power supply system, said soft start controlling unit controls the magnitude of current flowing through said current-adjusting element to be gradually increased, so that the magnitude of current flowing through said capacitor is gradually increased.

2. The power module according to claim 1 wherein said capacitor is configured to filter said DC voltage.

3. The power module according to claim 1 wherein in response to a rotating speed signal from said fan, said controlling unit issues said control signal to said fan.

4. The power module according to claim 1 wherein said soft start controlling unit comprises a charging circuit, wherein when said power module is connected with said connector of said power supply system, electric energy from said power supply system is transmitted to said charging circuit to charge said charging circuit, so that the magnitude of current flowing through said current-adjusting element is gradually increased.

5. The power module according to claim 4 wherein said charging circuit comprises at least one charging component.

6. The power module according to claim 5 wherein said soft start controlling unit further comprises a discharging circuit, wherein when said power module is detached from said connector of said power supply system, said charging component of said charging circuit is discharged by said discharging circuit.

7. The power module according to claim 6 wherein said soft start controlling unit further comprises an acceleration discharging circuit, wherein when said power module is detached from said connector of said power supply system, said charging component of said charging circuit is discharged at an accelerated speed by said acceleration discharging circuit.

8. The power module according to claim 1 wherein said controlling unit is connected with said fan through a protection circuit.

9. The power module according to claim 8 wherein if said control signal is abnormal, said protection circuit allows said fan to be continuously operated.

10. A power supply system, comprising:
    a power distribution circuit;
    plural connectors having respective first ends connected with said power distribution circuit; and
    plural power modules hot-swappable to be connected with second ends of corresponding connectors or detached from said second ends of corresponding connectors, wherein each of said power modules comprises:
        a power conversion circuit for outputting a DC voltage;
        a fan connected with said power conversion circuit;
        a controlling unit for issuing a control signal to said fan, thereby controlling operation of said fan;
        a capacitor connected with said fan in parallel;
        a current-adjusting element connected with said capacitor in series for adjusting the magnitude of current flowing through said capacitor; and
        a soft start controlling unit connected with said current-adjusting element, wherein when said power module is connected with said connector of said power supply system, said soft start controlling unit controls the magnitude of current flowing through said current-adjusting element to be gradually increased, so that the magnitude of current flowing through said capacitor is gradually increased.

* * * * *